Patented Dec. 17, 1940

2,225,197

UNITED STATES PATENT OFFICE 2,225,197

ADDITION AND STABILIZER AGENT FOR LUBRICATING OILS AND HYDROCARBON LIQUIDS (METAL - ALKOXIDE - CARBOXYLATES)

Bert Allen Stagner, Long Beach, Calif.

No Drawing. Application May 15, 1939,
Serial No. 273,762

9 Claims. (Cl. 252—35)

My invention is the preparation of chemical compounds and solutions of the chemical compounds. The compounds consist of a metallic element, especially aluminum, attached to both alkoxide and carboxylate radicals in the same molecule, such, for example, as aluminum attached to the butoxy group of butyl alcohol and the stearate group of stearic acid. Such molecules of mixed organic radicals are found to be characterized by high solubility in inert organic liquids and solvents and especially in lubricating oils. They are valuable as addition agents to increase the lubricating properties of oil, to decrease the tendency of the oil to cause piston rings to stick, and to increase the chemical stability of lubricating oils as well as of other unstable hydrocarbons like those of cracked gasoline.

These new products are formed by the chemical reaction between metal alkoxides and carboxylic acids (fatty acids and naphthenic acids). For example, an aluminum alkoxide, such as aluminum butoxide, Al(OC₄H₉)₃, is preferably first dissolved in an inert organic liquid; a calculated amount of fatty acid, such as stearic acid, is added, and the mixture heated so that a considerable portion of the stearic acid replaces a corresponding chemical equivalent of the butoxide groups attached to the aluminum atom, but does not replace all the alkoxide groups. If a mol equivalent of stearic acid could be made to displace completely one mol of an alkoxide group, the following three respective aluminum compounds could be produced from the addition of 1, 2, or 3 mols of the stearic acid: aluminum di-butoxide mono-stearate,

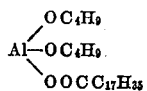

aluminum mono-butoxide di-stearate,

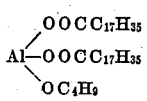

and aluminum tri-stearate, Al(CO₂C₁₇H₃₅)₃. It is evident from experiments reported below that the fatty acid does not, however, approach complete substitution; for illustration, if three mol equivalents of a fatty acid are added to one mol of the metal alkoxide, an appreciable portion of the alkoxide groups remains attached to the aluminum, and some of the fatty acid remains uncombined. This total replacement is difficult, if not impossible, and of cardinal importance is the fact that alkoxide groups enhance the solubility of the aluminum products in organic liquids.

The aluminum alkoxides themselves are highly soluble in all the common organic solvents and hydrocarbon oils; and if only one or two of the alkoxide groups attached to the aluminum atom are replaced by a fatty acid radical, the resulting compound is still highly soluble.

The present commercial aluminum stearates have no alkoxide groups to increase their solubility. These commercial salts are prepared by reacting in aqueous solution a water-soluble aluminum salt, such as aluminum sulfate, with an alkali or an alkali-earth salt of the fatty acid. As a consequence of using such ingredients, certain undesirable impurities are always left in the finished product, such as aluminum stearic acid sulfate, calcium sulfate, sodium sulfate, etc. These commercial stearates may be looked upon as reaction products between stearic acid and aluminum hydroxide. The latter compound, Al(OH)₃, is insoluble in the organic solvents and lubricating oils, and the modified aluminum compound becomes only somewhat soluble as a hydroxyl group or groups are replaced by the stearic acid radical or radicals, but even then the products have a very low degree of solubility in lubricating oils and other hydrocarbon liquids.

The commercial aluminum stearates are not available as pure stearates but as mixtures with a few per cent up to 25 per cent or more of free stearic acid, which free acid aids to some extent in dispersing the stearates in the hydrocarbon oils.

There is one citation in the literature to the I. G. Farbenind., A.-G., German Patent 569,946 (1933), in which an attempt is made to prepare the three pure aluminum salts of fatty acid of the formulas Al(OH)₂St, Al(OH)St₂, and AlSt₃ by treating alkoxides of aluminum with fatty acids. In this patent no alkoxide group or groups are left attached to the aluminum atom, and the method of preparing the three salts would eliminate, and is so designed to eliminate, all the alkoxide groups. The products thus made have the same fault of low solubility in hydrocarbon liquids as the other present commercial aluminum fatty acid salts.

The alkoxides of metals used in my invention are well known in organic chemistry. Typical of them are the aluminum alkoxides, and for their methods of preparation one can refer to the Journal of the American Chemical Society, 44, 2178-9; 45, 3013; "Organic Synthesis," vol. 15, 80 (1935), John Wiley & Sons, Inc., New York; Chemical Abstracts; Beilstein; etc.

Typical data of my preparations are given in the following Table 1, in which aluminum alkoxides (aluminum butoxide and aluminum isopropoxide) have been made to react in various inert organic liquids with different fatty and naphthenic acids and with different proportions of these acids. Greater details of three of the typical preparations of my new product are given in the following examples.

Example 1 (Table 1, Experiment 5). Five grams of aluminum butoxide was completely dissolved in 100 grams of a well-refined typical paraffin-base lubricating oil by heating the mixture to about 212° F. for a few minutes and stirring. Then 5.78 grams of stearic acid was added, and the mixture further heated and stirred for an hour or so, at the end of which time the solution was complete. In this example the amount of stearic acid was arbitrarily chosen as a mol equivalent in reference to the aluminum butoxide added. Thus it could theoretically replace one of the three butoxide groups attached to the aluminum atom. If the chemical reaction proceeded to complete substitution, the reaction could be expressed:

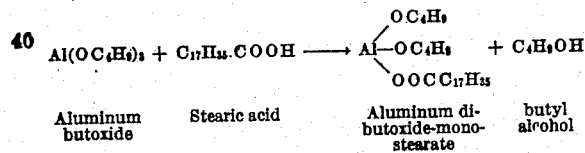

| Aluminum butoxide | Stearic acid | Aluminum di-butoxide-mono-stearate | butyl alcohol |

Example 2 (Table 1, Experiment 6). Two mol equivalents of stearic acid (11.56 g.) were used instead of one mol equivalent as in Example 1, but otherwise the weights of the other materials were the same. Thus the two mols have the possibility of replacing two of the three butyloxy groups attached to the aluminum atom:

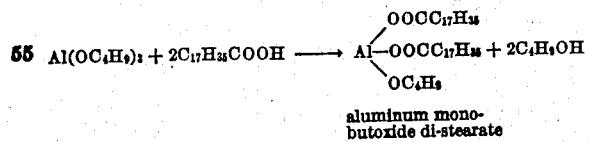

aluminum mono-butoxide di-stearate

Example 3 (Table 1, Experiment 7). Three mol equivalents of stearic acid (17.34 g.) were used instead of one mol as in Example 1, but again the same weights of lubricating oil and aluminum butoxide were employed. If the stearic acid could completely replace the three alkoxide groups, the reaction would be represented:

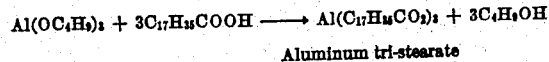

Aluminum tri-stearate

In the above experiments the products of the chemical reactions all went into solution, and no insoluble products were formed, such as the undesired sodium sulfate, aluminum sulfate, etc., common to the normal preparations of aluminum stearate salts. Moreover, a perfect solution of an aluminum salt was hereby prepared at least ten times more concentrated than would be used in a finished lubricating oil; such a concentrated solution thus provides a base stock which can conveniently be diluted with any additional volume of lubricating oil for the finished product. Approximately nine additional volumes of the lubricating oil are used in the experiments as given in Table 2.

Attention is here called to the fact that only a little stearic acid, one per cent or so, can be dissolved in lubricating oil. Any in excess soon settles out and causes a jelling of the oil. Likewise, only a very little mono-, di-, or tri-stearate can be dissolved in lubricating oil, and any excess of these ingredients that may be dispersed in the oil, by heating and agitating, immediately on cooling results in gelation, as evidenced by abnormally high viscosity increases. In contrast with these manifestations, very concentrated solutions of my products resulting from the reaction between the aluminum alkoxides and fatty acids remain dissolved in the oil. Even the most concentrated solutions that contain as much as 20 per cent by weight of the alkoxide-fatty acid reaction products do not undergo separation or precipitation on standing for many months, and their viscosities remain unaltered.

The change in the neutralization numbers of the products in the above three examples shows that complex reactions have occurred, but I cannot offer a reliable explanation of them. Under the method of determining the neutralization number of stearic acid, whether free or combined with the aluminum, the stearic acid should possess the same neutralization number. For example, 5.78 grams of stearic acid dissolved in 100 grams of lubricating oil has a neutralization number of 11.3. (The neutralization number of the lubricating oil itself is almost negligible, 0.2, see table 1, Exp. 1.) However, when the solution of the stearic acid is heated to 212° F. with the 5 grams of aluminum butoxide, the neutralization number drops to 6.1 (Table 1, Exp. 5). This final neutralization number indicates that about 46 per cent of the stearic acid has formed some rather stable combinations under the conditions of this experiment. When the solution is heated to about 600° F., (Table 1, Exp. 5A), the neutralization number drops to 0.7, a change which shows that the stearic acid has made still further complex chemical combination or chemical combinations.

In the second example, the 11.56 grams stearic acid, or two-mol equivalent, dissolved in the lubricating oil would have had a neutralization number of about 20.5, had not chemical reactions with the aluminum butoxide at 212° F. lowered it to 12.8 (Table 1, Exp. 6). This change in the neutralization number indicates that about 38 per cent of the stearic acid underwent some complex and not understood chemical reaction at 212° F. When the temperature in this mixture is elevated to 600° F. (Table 1, Exp. 6A), the neutralization number is reduced to 4.6, a change which indicates that at this temperature about 78 per cent of the two mols of stearic acid no longer is free to give a neutralization number.

In the third example, 17.34 grams stearic acid, three mol equivalents, dissolved in the lubricating oil would have had a neutralization number of about 29.3, had not the chemical reaction with the aluminum butoxide at 212° F. lowered it to 22.8. This drop in the number indicates that in addition to the normal formation of aluminum stearate, at least 23 per cent of the stearic acid underwent other chemical change. When the temperature was raised to 600° F. (Table 1, Exp. 7A), the neutralization number dropped to 8.9, an indication that about 70 per cent of the stearic acid entered into some complex chemical combination.

The effect of different temperatures on the neutralization number of a given aluminum alkoxide and fatty acid in a solvent was examined, and the data are recorded in Table 3.

TABLE 3.—*Effect of different temperatures on the neutralization number of a given stock containing lubricating oil (100 g.), aluminum butoxide (5 g.), and stearic acid (11.58 g., or 2 mol equivalents). (Stock of Experiment 5, Table 1). Heating time, 1 hour.*

| Temperature of heating, °F | 212 | 300 | 400 | 500 |
|---|---|---|---|---|
| Neutralization number of heated product | 12.7 | 12.4 | 11.3 | 4.0 |

The above oil solutions that were heated to 212°, 300°, and 400° F. were viscous semi-fluids when cooled; but the solution heated to 500° F. was a thin, mobile liquid when cooled. In all cases the heating to around 500° F. causes an appreciable drop in the viscosity of such stocks. A considerable change thus occurs at 400° to 500° F.

Experiments not here tabulated also show that when the experiments described early in this paper as Examples 1, 2, and 3, involving the 1, 2, and 3 mol equivalents of stearic acid, are conducted at 350° F. and under a reduced pressure of 48 mm., an appreciable portion of the stearic acid undergoes change other than the simple combination with the aluminum to form aluminum stearate. Under this procedure, the neutralization numbers were, respectively, 4.0, 10.3, and 13.0. Calculations from these neutralization numbers indicate that, respectively, 65, 50, and 41 per cent of the stearic acid has undergone the unknown but complex change. When these products were subsequently heated to 550° F. at normal pressures, the neutralization numbers were 3.0, 9.3, and 9.7, respectively. It thus appears that when three mol equivalents of stearic acid are added to one mol of aluminum alkoxide, a quantitative yield of aluminum tri-stearate is not obtained.

All the experiments of Table 1 show that the metal butoxides interact with the fatty acid and lower the neutralization number of the latter. The solvents tested were the typical lubricating oils from paraffin-base crude oil and a typical lubricating oil from California asphalt-base crude oil, S. A. E. No. 30 (Exp. 15, 16, 17); benzol (Exp. 18, 19); and a petroleum cleaners' solvent, Stoddard type (Exp. 20, 21).

An experiment not here tabulated was made in which molar proportions of aluminum butoxide (5 g.) and stearic acid (5.78 g.) were mixed together without solvent and heated for an hour or so at about 290° F. The two melted together and evolved vapor (butyl alcohol) quite readily. When cooled, the product was a soft, transparent, amber-colored, resin-like material. One hundred grams of cleaners' solvent was stirred into this reaction mass, which yielded a thin, syrupy liquid of neutralization number 7.4. The solution was diluted with 100 grams more of the cleaners' solvent, and then the solution was non-viscous and clear and could readily be incorporated into lubricating oils or used for other purposes.

In the data of Table 1, the fatty acids used were stearic, palmitic, and oleic. In addition to these typical acids, naphthenic acid, as another representative organic acid, was used in Experiments 50 and 52 of Table 2. Similar results followed when a mixture of different fatty acids was used in the same solution (Table 2, Exp. 51, 52). In these last experiments, a mol equivalent of one fatty acid was added, then a mol equivalent of a second acid, etc. Obviously, the acids need not in any case be added in molar equivalents, and any number of different fatty acids or naphthenic acids could be used.

Many "compounded" lubricating oils were prepared from the reaction products of metal alkoxides and fatty acids (including naphthenic acid) in accordance with my invention. Nearly all of the products of Table 1 resulting from reacting metal alkoxides and fatty acids in lubricating oils as solvent were further diluted with about nine volumes of the same kind of lubricating oil already used so that the final lubricating oil would have an ash content of approximately 0.10 per cent by weight. The ash content of commercial compounded lubricating oils is preferably kept considerably below about 0.15 per cent to avoid excessive wear by abrasion due to too high ash content. This preferred method of incorporating the alkoxide-organic acid product provides a very simple procedure for preparing the desired compounded lubricating oils.

The composition of the above compounded oils and their chemical and physical properties are shown in Table 2. Table 2 thus presents many examples of oils compounded from my products, but of course an endless variety of combinations can be made with the given products and with other metal alkoxides and various acids. Column 2 of Table 2 shows examples of the temperatures at which the solution of alkoxide, fatty acid, and the lubricating oil solvent were heated before the final dilution with more of the lubricating oil. The additional data of this table pertain to the original lubricating oils and the final compounded oils and show the amounts of alkoxide, fatty acid (and mol equivalents of the fatty acid employed), the viscosities (Saybolt Universal) at 100° and 210° F., neutralization numbers, ash content, and finally, for some of the oils, the Conradson Carbon.

The viscosity data of Table 2 show for the most part that the compounded lubricating oils have considerably lower viscosities when the compounding was done at 600° F. than at 212° F. (cf. each of the Experiments 41A, 42A, 43A, 47A, with the experiment immediately preceding).

Samples from most of these compounded lubricating oils were placed in test tubes, the test tubes loosely stoppered with plugs of cotton, and the samples exposed for a total of eight weeks to sunshine. Corresponding samples of the original lubricating oils were similarly exposed, and the time noted for discoloration to occur. The original oil darkened first, appreciably in two weeks. The next to darken were the samples compounded at 212° F., and the last were those compounded at 600° F. Those of the last group were as good in color at the end of eight weeks of exposure as the unprotected samples were after the first two weeks of exposure.

A compounded lubricating oil prepared according to the formula of Experiment 41, Table 2, and thus containing somewhat less than one per cent of aluminum-stearate-butoxide, was placed in the crankcase of a Dodge automobile, and at the end of 1000 miles driving, the oil was removed and compared with a corresponding sample of lubricating oil which did not contain the addition agent. It was found that the addition agent in the first sample of oil had caused that sample to form less carbon, sludge, and color, and to have less tendency to cause the piston rings to stick. Also the general appearance of the engine was much superior after the use of the first oil than after the second.

A small amount of the reaction product of aluminum butoxide and stearic acid in cleaners' solvent, Table 1, Exp. 21, was tested for stabilizing the color of cracked gasoline, as follows: 2 ml. of the above solution (about 0.15 g. of butoxide plus stearic acid) was added to 98 ml. of cracked gasoline which had been refined to 30 color, Saybolt colorimeter. The color of the cracked gasoline was lowered at once to 26 color. This 100-ml. sample and a 100-ml. sample of the 30 color cracked gasoline were exposed in clear glass sample bottles, loosely stoppered with cotton, to the sun for one hour. The exposure darkened the gasoline containing the chemical reagent only to 20 color, whereas it darkened the unprotected sample of gasoline to a 4 color. Thus the sample protected by the small amount of aluminum derivative dropped only 6 points while the unprotected sample dropped 26 points in color.

The reaction between the metal alkoxide and fatty acids as illustrated in Tables 1 and 2 can be brought about preferably in an inert organic solution; but, as shown, the solvent can be omitted. For use in the compounding of lubricating oils, a portion of the lubricating oil itself is preferably used as solvent, and the solution later diluted to the desired degree with additional quantities of the lubricating oil. Also a low-boiling inert organic substance, such as a petroleum or aromatic hydrocarbon or an alcohol, can be used as solvent for the reaction products, and then before or after being added in desired proportion to the lubricating oil, the volatile solvent and free alcohol can be, if so desired, expelled by heat or by heat under reduced pressure.

The choice of alcohol for preparing the alkoxides is broad. The aluminum butoxide and the fatty acids used in most of the experiments are illustrative, and it is evident that other alkoxides and other fatty acids could be used. Substituted fatty acids, such as phenyl stearic acid, substituted alcohols, cyclohexanol, phenols, and alkyl phenols, obviously would be included.

The characteristic property of aluminum to form stable alkoxides is shared by other metals, such as calcium, magnesium, tin, bismuth, arsenic, chromium, manganese, lead, zinc, etc.

In the claims of my invention, the expression "inert organic liquid" includes lubricating oils, gasolines, hydrocarbon liquids, and all the common chemically inert organic solvents other than hydrocarbon liquids. The term "carboxylic acids" includes the naphthenic acids as well as the usual fatty acids and only the carboxylic acids having ten or more atoms of carbon are desired to be claimed in this patent. Carboxylic acids having less than ten atoms of carbon are not claimed.

TABLE 1.—*Reactions of alkoxides with higher molecular weight carboxylic acids in inert organic liquids (alkoxide, 5 g. aluminum butoxide, except where noted; carboxylic acid, 1, 2, or 3 mols referred to the alkoxide; inert organic liquid, 100 g.)*

| Exp. No. | Temp. of compounding, °F. | Inert organic liquid, 100 g. | Aluminum butoxide, g. | Carboxylic acid | | | | Neut. No. |
|---|---|---|---|---|---|---|---|---|
| | | | | Grams | Mol equivalent | | | |
| | | | | | | Stearic | Palmitic | Oleic | |
| 1 | | Lub. oil SAE 20 (a) | 0 | 0 | 0 | 0 | 0 | 0.02 |
| 2 | | Lub. oil SAE 30 (b) | 0 | 0 | 0 | 0 | 0 | 0.01 |
| 3 | | Lub. oil SAE 20 (a) | 5 | 0 | 0 | 0 | 0 | 0.4 |
| 4 | | Lub. oil SAE 20 (a) | 0 | 5.78 | (1) | 0 | 0 | 11.3 |
| 5 | 212 | do | 5 | 5.78 | 1 | 0 | 0 | 6.1 |
| 5A | 600 | do | 5 | 5.78 | 1 | 0 | 0 | 0.7 |
| 6 | 212 | do | 5 | 11.56 | 2 | 0 | 0 | 12.8 |
| 6A | 600 | do | 5 | 11.56 | 2 | 0 | 0 | 4.6 |
| 7 | 212 | do | 5 | 17.34 | 3 | 0 | 0 | 22.8 |
| 7A | 600 | do | 5 | 17.34 | 3 | 0 | 0 | 8.9 |
| 8 | 212 | do | 0 | 5.21 | 0 | (1) | 0 | 9.3 |
| 9 | 212 | do | 5 | 5.21 | 0 | 1 | 0 | 5.2 |
| 10 | 212 | do | 5 | 10.42 | 0 | 2 | 0 | 11.4 |
| 11 | 212 | do | 0 | 5.74 | 0 | 0 | (1) | 10.4 |
| 12 | 212 | do | 5 | 5.74 | 0 | 0 | 1 | 8.1 |
| 12A | 600 | do | 5 | 5.74 | 0 | 0 | 1 | 0.8 |
| 13 | 212 | do | 5 | 11.48 | 0 | 0 | 2 | 12.9 |
| 13A | 600 | do | 5 | 11.48 | 0 | 0 | 2 | 4.2 |
| 14 | 212 | do | 5 | 17.22 | 0 | 0 | 3 | 19.5 |
| 14A | 600 | do | 5 | 17.22 | 0 | 0 | 3 | 11.6 |
| 15 | 212 | Lub. oil SAE 30 (b) | 0 | 5.78 | (1) | 0 | 0 | 11.3 |
| 16 | 212 | do | 5 | 5.78 | 1 | 0 | 0 | 5.4 |
| 17 | 212 | do | 4.15 (c) | 5.78 | 1 | 0 | 0 | 5.6 |
| 18 | 176 | Benzol (com'l.) | 0 | 5.78 | (1) | 0 | 0 | 11.3 |
| 19 | 176 | do | 5 | 5.78 | 1 | 0 | 0 | 6.5 |
| 20 | 212 | Cleaners' solvent | 0 | 5.78 | (1) | 0 | 0 | 11.3 |
| 21 | 212 | do | 5 | 5.78 | 1 | 0 | 0 | 4.8 |

(a) Paraffin-base lubricating oil. (b) Asphalt-base lubricating oil. (c) Aluminum iso-propoxide used in Exp. 17. The 4.15 grams is a mol equivalent of 5 grams of aluminum butoxide.

TABLE 2.—*Composition and properties of lubricating oil containing addition agent. Prepared by (1) combining 5 grams aluminum butoxide and carboxylic acids in 100 grams lubricating oil at given temperature to make base stock, (2) diluting base stock with more of same lubricating oil to yield 1000 grams compounded oil.*

| Exp. No. | Temp. of compounding base stock, °F. | Aluminum butoxide, g. | Carboxylic acid | | | | | | Viscosity at °F. | | Neut. No. | Ash, percent | Conradson carbon percent (a) |
| --- | --- | --- | --- | --- | --- | --- | --- | --- | --- | --- | --- | --- | --- |
| | | | Grams | Mol equivalent | | | | | 100 | 210 | | | |
| | | | | Stearic | Palmitic | Oleic | Naphthenic | | | | | | |
| 40 | | | (Original paraffin-base lub. oil, SAE 20) | | | | | | 358 | 57 | 0.02 | 0.0 | 0.46 |
| 41 | 212 | 5 | 5.78 | 1 | 0 | 0 | 0 | | 359 | 61 | 0.67 | 0.11 | 0.63 |
| 41A | 600 | 5 | 5.78 | 1 | 0 | 0 | 0 | | 365 | 60 | 0.08 | 0.11 | ---- |
| 42 | 212 | 5 | 11.56 | 2 | 0 | 0 | 0 | | 402 | 62 | 1.50 | 0.11 | 0.67 |
| 42A | 600 | 5 | 11.56 | 2 | 0 | 0 | 0 | | 358 | 59 | 0.53 | 0.11 | ---- |
| 43 | 212 | 5 | 17.34 | 3 | 0 | 0 | 0 | | 378 | 65 | 2.78 | 0.11 | 0.62 |
| 43A | 600 | 5 | 17.34 | 3 | 0 | 0 | 0 | | ---- | 58 | 1.09 | 0.11 | ---- |
| 44 | 212 | 5 | 5.21 | 0 | 1 | 0 | 0 | | ---- | ---- | 0.57 | 0.11 | ---- |
| 45 | 212 | 5 | 10.42 | 0 | 2 | 0 | 0 | | ---- | ---- | 1.31 | 0.11 | ---- |
| 46 | 212 | 5 | 5.74 | 0 | 0 | 1 | 0 | | ---- | ---- | 0.89 | 0.11 | 0.65 |
| 46A | 600 | 5 | 5.74 | 0 | 0 | 1 | 0 | | 359 | 61 | 0.09 | 0.11 | ---- |
| 47 | 212 | 5 | 11.48 | 0 | 0 | 2 | 0 | | 366 | 58 | 1.50 | 0.11 | ---- |
| 47A | 600 | 5 | 11.48 | 0 | 0 | 2 | 0 | | 431 | 65 | 0.49 | 0.11 | ---- |
| 48 | 212 | 5 | 17.22 | 0 | 0 | 3 | 0 | | 341 | 59 | 2.38 | 0.11 | ---- |
| 48A | 600 | 5 | 17.22 | 0 | 0 | 3 | 0 | | ---- | ---- | 1.40 | 0.11 | ---- |
| 49 | 212 | 0 | 4.70 | 0 | 0 | 0 | (1) | | ---- | ---- | 1.07 | | ---- |
| 50 | 212 | 5 | 4.70 | 0 | 0 | 0 | 1 | | 370 | 60 | 0.99 | 0.11 | 0.70 |
| 51 | 212 | 5 | { 5.78 / 5.74 } Mixed carboxylic acids | 1 | 0 | 1 | 0 | | 385 | 64 | 1.70 | 0.11 | ---- |
| 52 | 212 | 5 | { 5.78 / 5.74 / 4.70 } | 1 | 0 | 1 | 1 | | 371 | 58 | 2.99 | 0.11 | ---- |

(a) The Conradson carbon data from "compounded" oils also include aluminum oxide.

I claim:

1. A solution of a small amount of metal-alkoxide-carboxylate stabilizing agent in a chemically unstable hydrocarbon liquid of the class of lubricating oils and cracked gasolines, the metal-alkoxide-carboxylate being made by reacting together a metal alkoxide and a higher molecular weight carboxylic acid containing at least 10 carbon atoms, the metal having a valence greater than one.

2. An addition agent in solution in lubricating oil for improving the performance of the lubricating oil, said addition agent being a metal-alkoxide-carboxylate produced by the chemical reaction between a metal alkoxide and a carboxylic acid containing at least 10 carbon atoms, the metal of the metal alkoxide having a valence greater than one.

3. An addition agent in solution in lubricating oil for improving the performance of the lubricating oil, said addition agent being an aluminum-alkoxide-carboxylate produced by the chemical reaction between aluminum alkoxide and a carboxylic acid containing at least 10 carbon atoms.

4. A lubricating oil comprising a solution of a hydrocarbon oil and a small quantity of a metal-alkoxide-carboxylate, the metal atom of which is one of the group consisting of aluminum, magnesium, and calcium, and the carboxylate radical is that of a carboxylic acid containing at least 10 atoms of carbon.

5. A lubricating oil comprising a solution of a hydrocarbon oil and a small quantity of the products resulting from the chemical reaction between carboxylic acid, having at least 10 atoms of carbon, and aluminum alkoxide, the resulting aluminum carboxylate derivative thus formed possessing greater oil solubility than aluminum carboxylates not containing alkoxide groups.

6. A lubricating oil containing a small quantity of addition agent consisting of a metal-alkoxide-carboxylate and in quantity not great enough to produce over one per cent ash if calculated as the oxide of the metal, the metal atom of which consists of one of the group consisting of aluminum, magnesium, and calcium, and the carboxylate radical is that of a carboxylic acid having at least 10 carbon atoms.

7. A lubricating oil containing an addition agent, said agent consisting of aluminum-alkoxide-carboxylate produced by reacting together in solution in lubricating oil an aluminum alkoxide and carboxylic acid, the carboxylic acid containing at least 10 atoms of carbon.

8. The preparation of a lubricating oil containing an addition agent by first reacting together in an inert organic liquid a metal alkoxide and a carboxylic acid containing at least 10 atoms of carbon, the metal of said metal alkoxide being one of the group consisting of aluminum, magnesium, and calcium, and then adding products resulting from the reaction between the alkoxide and the carboxylic acid to a lubricating oil in such quantity that the ash content of the lubricating oil shall not be greater than one per cent, calculated as the oxide of the metal.

9. A lubricating oil containing an addition agent, said addition agent being a metal-alkoxide-carboxylate produced by first reacting together in solution in lubricating oil a metal alkoxide and a carboxylic acid, the metal of the metal oxide being one of the group consisting of aluminum, magnesium, and calcium, and the carboxylic acid containing at least 10 atoms of carbon; and finally diluting the above solution with sufficient additional lubricating oil so that the ash content of the final oil solution shall not be greater than one per cent when calculated as the oxide of the metal employed.

BERT ALLEN STAGNER.